（12) United States Patent
Wessel et al.

(10) Patent No.: US 8,191,306 B2
(45) Date of Patent: Jun. 5, 2012

(54) EARTHEN VASE, METHOD FOR USE AND FORMING TOOL

(76) Inventors: Lloyd E. Wessel, Louisville, KY (US); Edward O Wessel, Louisville, KY (US)

(*) Notice: Subject to any disclaimer, the term of this patent is extended or adjusted under 35 U.S.C. 154(b) by 0 days.

(21) Appl. No.: 13/194,319

(22) Filed: Jul. 29, 2011

(65) Prior Publication Data

US 2011/0285153 A1    Nov. 24, 2011

Related U.S. Application Data

(62) Division of application No. 12/427,288, filed on Apr. 21, 2007, now Pat. No. 8,011,131.

(51) Int. Cl.
*A01G 5/04* (2006.01)
(52) U.S. Cl. ................... 47/41.1; 47/58.1 CF
(58) Field of Classification Search ............ 47/41.1, 47/58.1 CF; 111/89, 92; 172/22
See application file for complete search history.

(56) References Cited

U.S. PATENT DOCUMENTS

| 3,113,534 | A | * | 12/1963 | Wessel ............................ 111/89 |
| 3,273,930 | A | * | 9/1966 | Gottfried ....................... 111/101 |
| 3,506,296 | A | * | 4/1970 | Nelson .......................... 111/101 |
| 3,586,109 | A | * | 6/1971 | Eversole et al. ................ 172/22 |
| 4,723,607 | A | * | 2/1988 | Hansen ........................... 172/22 |
| D300,223 | S | * | 3/1989 | Livingstone .................. D15/29 |
| 5,408,893 | A | * | 4/1995 | McLeroy .................. 73/864.44 |
| 7,451,832 | B1 | * | 11/2008 | Delvo ............................. 172/25 |
| 8,011,131 | B2 | * | 9/2011 | Wessel et al. ................. 47/41.1 |
| 2011/0285153 | A1 | * | 11/2011 | Wessel et al. ............... 294/50.7 |

* cited by examiner

*Primary Examiner* — Frank T Palo
(74) *Attorney, Agent, or Firm* — Wood, Herron & Evans, LLP

(57) ABSTRACT

A water percolating earthen vase with smooth, compacted walls is formed in the earth. Water is applied and stems of cut flowers inserted for flower display. Water percolates from the vase, eliminating undesirable standing and stagnant water. Methods and forming tool are disclosed.

7 Claims, 4 Drawing Sheets

EARTHEN VASE, METHOD FOR USE AND FORMING TOOL

This application is a divisional of allowed U.S. patent application Ser. No. 12/527,288, filed Apr. 21, 2009 and now U.S. Pat. No. 8,011,131, the priority of which is herewith claimed. Said prior application is herewith incorporated herein by reference.

FIELD OF THE INVENTION

This invention relates to floral displays and more particularly to the display of cut flowers in settings such as cemeteries, memorial gardens and the like.

BACKGROUND OF THE INVENTION

Use of flowers and plants for decorative or memorial purposes or for aesthetic appearances in cemeteries, memorial gardens and the like is well-known. The use of flowers and plants in these areas, however, is attended by numerous difficulties, unintended consequences and regulatory requirements.

For example, it is common to place cut or live flowers or plants (all considered "flora") in a metallic or plastic vase or in a vase of other material and to place the vase on or near a cemetery headstone or garden structure or in a garden location. Such vases tend to support the flora both positionally or physically, as well as biologically in that the vases contain water to extend the life and beauty of the flora. Use of such vases inherently constitutes near and longer term problems.

First, water tends to remain in the vases, not only during, but after the useful aesthetic life of flora therein. This water tends to stand in the vase, whether introduced when the flora is first placed, or thereafter, by natural accretion such as rain, or other precipitation or such as by artificial replenishment directly or by sprinkling. It stagnates or becomes a breeding ground for mosquitoes or other insects.

This is such a problem that various Public Health Departments and Governmental Agencies, such as the EPA, National Cemeteries and the like, have regulations strictly regulating the use and, in some cases, the removal or periodic emptying of such containers. These needs and regulations increase maintenance costs or cause families undue hardship in the maintenance of flora and vases for memorial purposes. They sometimes require emptying, covering, draining or removal of containers when not in use, whether freestanding or part of a monument, memorial or structure. Some ordinances for example, even require emptying at certain times upon penalty of fine or even imprisonment. Currently, cemetery visitors must either bring their own vases or obtain them from the cemetery personnel. These must typically be removed for mowing or trimming operation when above ground vases are allowed during a growing season.

In large cemeteries and memorial gardens, these maintenance requirements can be very labor intensive. In one example, a large cemetery in Louisville, Ky. comprises over 300 acres with sixteen miles of paved cemetery access roads. Currently, that cemetery empties water from vases, canisters, permanent containers and bronze in-ground containers twice a week. The logistics and costs of this attention are readily apparent.

Moreover, above ground receptacles present obstacles to weeding and mowing activities in the warmer growing months. And even in-ground vases or containers of brass, bronze, copper or the like are or may become targets for vandalism or theft.

Finally, it is noted that for longevity of flora's aesthetic beauty, florists sometimes provide a packet of plant food or fertilizer for use with water in such containers of current usage.

Accordingly, it is one objective of the invention to provide an improved vase for floral use in cemeteries, memorial gardens and the like, and which does not require emptying or draining of water therein.

Another objective of the invention has been to provide an improved vase for cemetery memorial gardens or other outdoor use which is not required to be moved for mowing or weeding purposes.

Another objective of the invention is to provide an improved vase for outdoor use and which is not susceptible to theft or vandalism.

Another objective of the invention has been to provide an improved process for displaying flora in cemeteries, memorial gardens or the like.

SUMMARY OF THE INVENTION

To these ends, the invention contemplates an earthen vase which is easily oriented proximate a head or marker stone in a cemetery or at a position in an appropriate garden location. The earthen vase is formed in the earth by a tool capable of insertion to create the vase in the earth and being retractable therefrom to leave a vase interior with smoothed earthen side walls. Flora, preferably such as cut flowers or plants with stems, are placed in the vase, stems down, and water is added to the vase interior. The water hydrates the stems while present, but fairly rapidly percolates through the smooth, porous sides of the vase onto the surrounding earth. Thus, the vase does not capture standing water beyond a time period within which the water naturally percolates through the vase sides into the surrounding soil. This percolation and surrounding dampened soil extends the aesthetic freshness or beauty of the fresh cut flowers, for example, particularly where water is poured into the vase several times prior to cut flower stem placement there. Yet water is not retained in such standing condition as would harbor mosquitoes or stagnation.

Such earthen vases can be refilled with flowers numerous times; the vases tend to hold their shape indefinitely. With reasonable surrounding turf, the vases remain nearly invisible when not filled with flora.

Aesthetic longevity of flora in such earthen vases is equal to or better than typical vases when the flora stems are submerged in water captured in such prior vases. The surrounding earthen walls provide both moisture and nutrients which may leach into the vase interior through the earthen walls. And in any event, no additional fertilizer or plant food is required.

It is preferred to create the earthen vase with a surgical incision produced by the use of a vase creating tool, such as a tool comprising a modification of the root feeding tool disclosed in my prior U.S. Pat. No. 3,113,534 issued Dec. 10, 1963 and incorporated herein by express reference. That tool was useful in opening soil around the roots of a tree for example, to allow placement of fertilizer therein for feeding the tree. Soil removed for fertilizer placement is replaced over the fertilizer.

Presently, a modified tool is preferred herein and includes an inwardly tapered cutting end for surgically incising a hole in the earth proximate a marker or other desired location. The minor diameter leading or entry end of the tool forms the vase, while the slightly larger diameter tube sidewalls above the entry end tend to compress and smooth the vase walls as the tube is inserted to form the vase and is thereafter withdrawn.

The outward extrusive force exerted by the tool above the entry end thus forms the vase walls for smoothness and for durability. Otherwise, the tool is similar to that in my prior U.S. Pat. No. 3,113,534.

It will also be appreciated, however, that the inward taper on the entry end of the tool forms a smaller diameter "core", removed from the vase, than the major interior tube above the entry end, permitting the removed core to be easily discharged or discarded from the tool upon forming the earthen vase.

According to the invention, a tool for forming the vase includes an integral tube and preferably at least a step-like member attached to the tube which can be pressed by the foot of an operator for urging the tool into the ground at a forward end thereof, said forward end being tapered axially inwardly to define an interior forward end diameter less than the major interior diameter of an interior of the tube above the forward end thereof.

A method according to the invention includes the steps of: punching a hole in the earth to form a vase having porous earthen wall surfaces; introducing water into the vase and disposing the stems of cut flowers into the vase.

A further step includes allowing the water to percolate through earthen wall surfaces of the vase.

A further step comprises forming said hole with a surgical incision smoothing the earthen wall surfaces of the vase.

A further step includes discarding the soil removed from the hole to form the vase.

A yet further step includes removing older flowers from said vase and replacing said older flowers in said vase.

A product according to the invention includes the combination of: a hole in the earth defining an earthen vase having a smooth but porous interior wall surface; and a plurality of cut flowers having stems disposed within said vase.

In a further embodiment of said product, said vase is disposed proximate a manmade monument.

In a further embodiment, said monument is disposed in a cemetery.

In a further embodiment, said vase does not contain standing water beyond a time in which water in said vase percolates into soil surrounding said porous interior wall surface.

In a further embodiment, said vase comprises a cylindrical hole of surgical incision.

In a further embodiment, said interior wall surface of the earthen vase is smooth without significant earthen granulation. The wall surface is defined by earth slightly compacted to a greater degree than the soil surrounding the vase.

The invention, in another of its aspects, comprises a tool for forming an earthen vase, said tool comprising a tube having a first interior diameter, a forward end tapering radially inwardly to a second interior diameter which is less than said first diameter, wherein the tool forms an earthen vase having a smooth but still porous wall surface compacted by tool insertion.

A further aspect of said tool contemplates said tube and said forward end being integral, wherein said tube behind said forward end compacts and smoothes the walls of said earthen vase when manipulated with respect to earth defining said vase.

In another aspect of the invention, the earthen vase according to the invention is preferably about 5-7 inches deep and preferably about ⅝ inch to about 3 inches in diameter. The combination of depth and diameter is related to the appearance of cut flowers placed therein. The larger diameter vase will allow the flowers to lean outwardly at an angle, permitting use of more flowers for a fuller appearance. Narrower diameter bases enhance a standup appearance of fewer flowers, from several stems to just one.

It will be appreciated the invention thus contemplates at least a reusable earthen vase, or forming method and tool, and a display method wherein cut flowers can be displayed in a setting without creating a container of undesirable standing water, susceptible to theft, requiring drainage and requiring movement prior to mowing, weeding or maintenance operations. Instead, the earthen vase of the invention does not harbor standing water, is not susceptible to theft of vandalism, requires no drainage attention and does not have to be moved for mowing or maintenance.

These and further objectives and advantages will become readily apparent from the following written description and from the drawings in which:

DETAILED DESCRIPTION OF THE INVENTION

As used here, the phrase "earthen vase" refers to an open container, preferably of greater depth than width, and formed not just of, but within, the earth and thus earthly.

Figure 1:
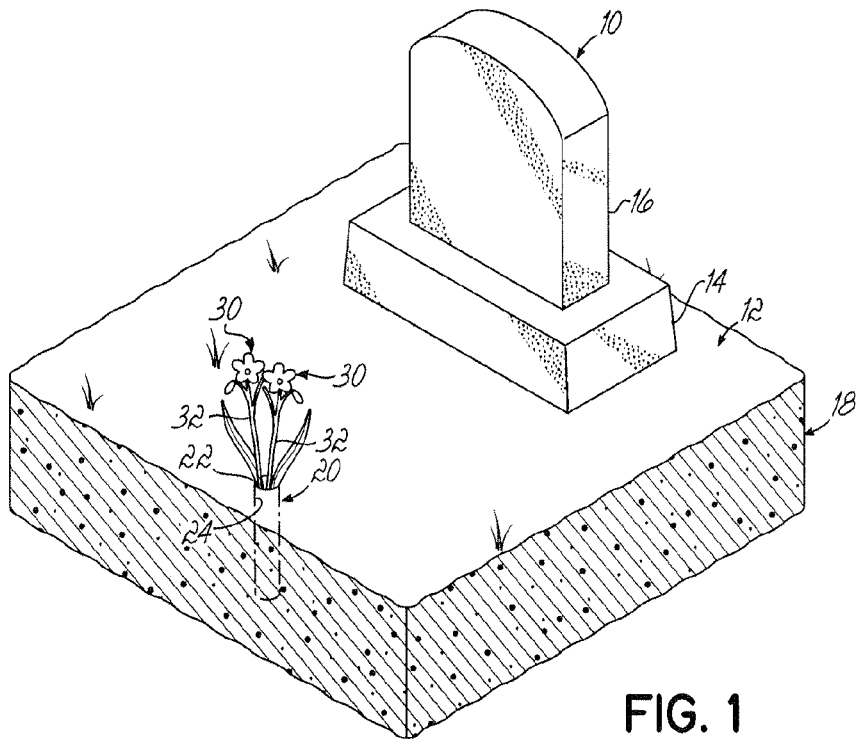
FIG. 1 is a cut-away perspective drawing illustrating the earthen vase according to the invention and its use in supporting and displaying cut flowers.
Figure 2:
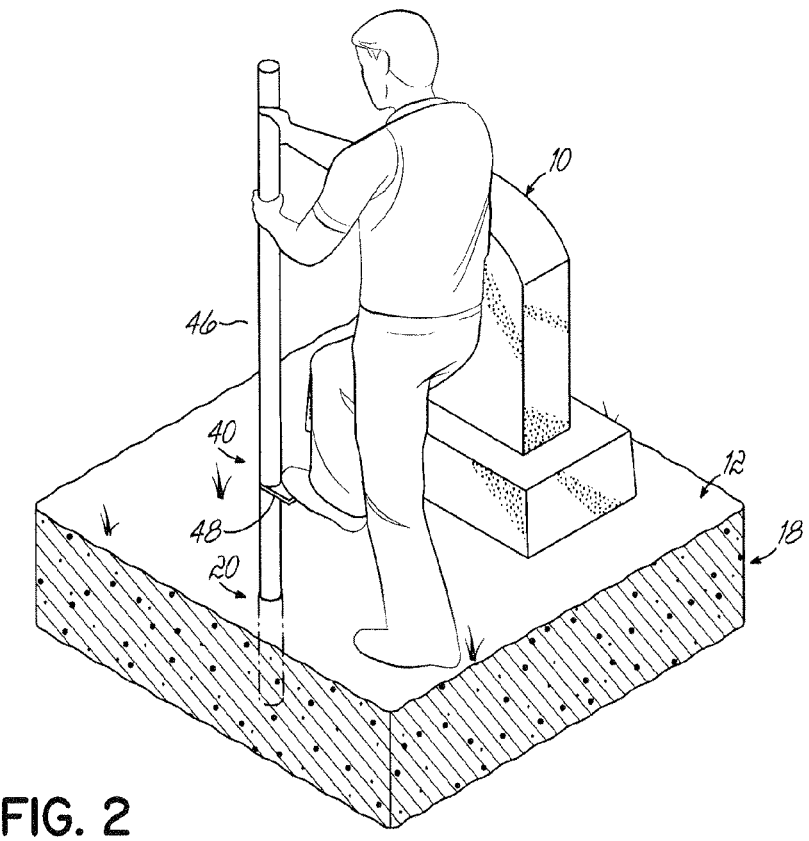
FIG. 2 is a perspective view illustrating creation of the earthen vase of the invention.

Turning now to FIG. 1, there is depicted as an example, a headstone or cemetery marker 10 oriented in a graveyard and particularly at a grace location defined on the ground level 12 of a cemetery. Marker 10 has a typical base 14 and upright stone 16.

An earth portion under the ground level 12 on which the marker is placed is shown in cross-section at 18 for illustrative purposes. Marker 10 (base 14) may be disposed on, or sunken below the ground level 12.

An earthen vase 20 for floral display is formed in earth portion 18 preferably near adjacent but not necessarily in front of marker 10. Vase 20 has a depth in the preferable range of from about five inches to about seven inches. Vase 20 has an open top 22, preferably circular, and with a diameter of preferably from about ⅝ inches to about 3 inches.

The interior wall surface 24 of vase 20 is formed with a surgical incisiveness such that the surface is relatively smooth, but also sufficiently porous so that water in vase 20 can percolate into the surrounding earth 18.

FIG. 1 shows cut flora, such as cut flowers 30, having stems 32 placed into vase 20. While only two flowers 30 are shown, it will be appreciated that a single cut flower or a plurality of cut flowers greater than two can be used.

To some extent, the aesthetic appearance of flowers 30 in vase 20 will depend on the nature of the flowers (type), length of stem and number of stems in vase 20 relative to the diameter of the vase. It will be appreciated that a small vase 20 will tend to hold fewer flowers in an aesthetic, upright orientation, while a larger vase 20 will accommodate a more spread out flower orientation, or more flowers in number. It is believed that the preferred ranges of vase depth and diameter expressed herein are likely to preferably accommodate the most likely number and arrangement of cut flowers typically used at such sites.

Moreover, it will be appreciated that vase 20 is preferably defined as an upright cylinder with smooth but permeable interior earthen surfaces 24. Alternately, the cylindrical vase 20 could be formed in the ground 12 at an angle to the vertical.

Figure 3:
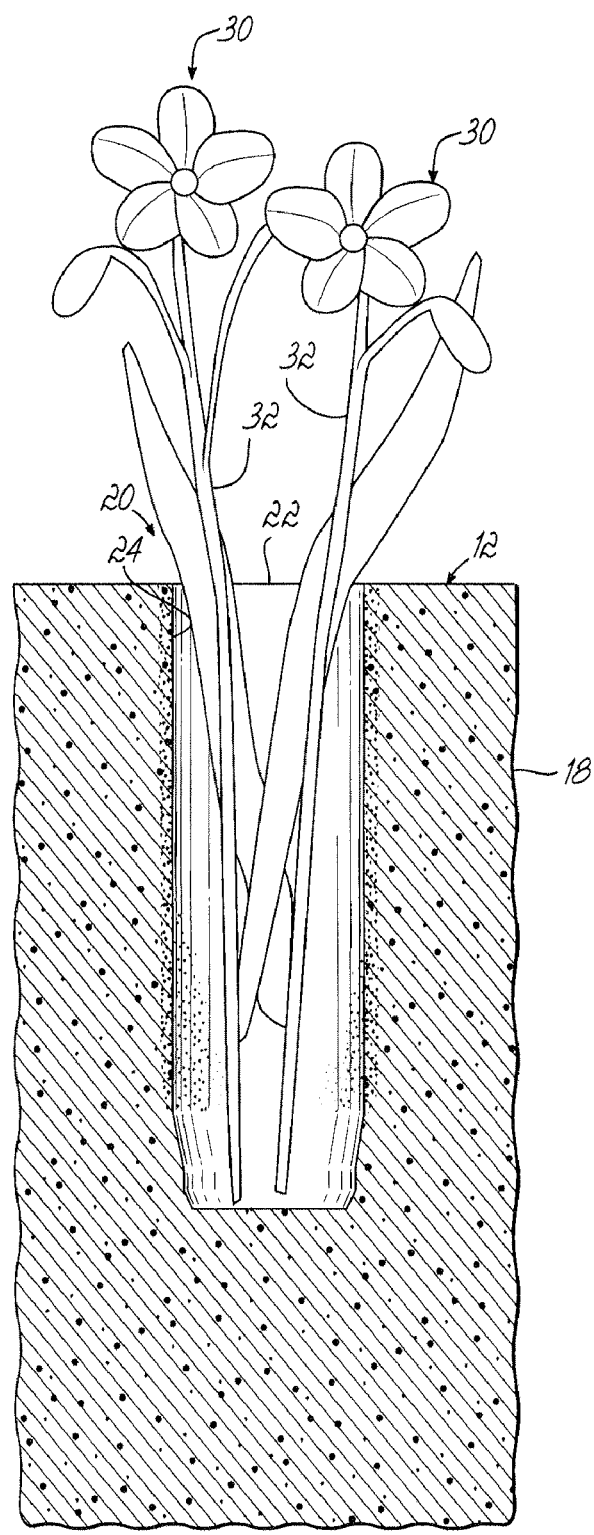
FIG. 3 is an illustrative cut-away view of the earthen vase of the invention.

FIG. 3 illustrates earthen vase 20 according to the invention formed in earth 18 beneath ground level 12, and with stems 32 therein and flowers 30 thereabove.

Figure 4:
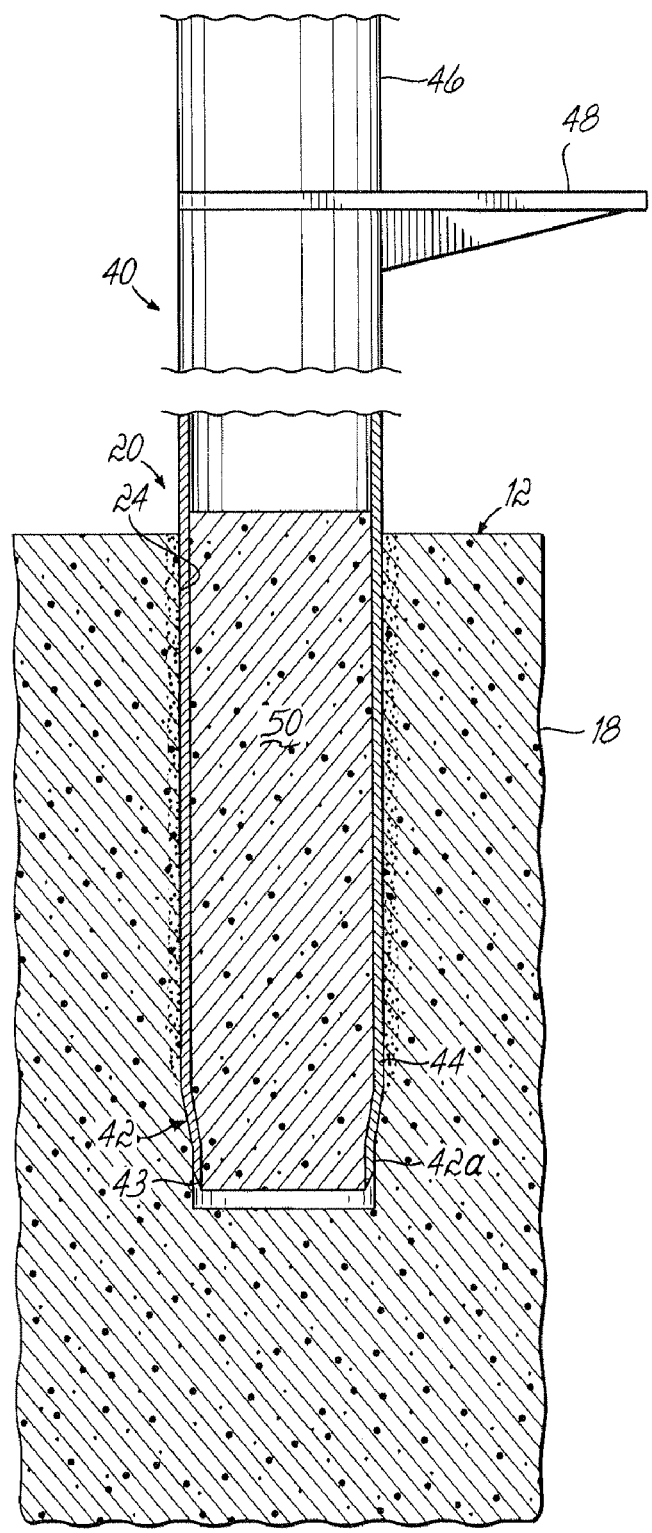
FIG. 4 is an illustrative elevational view of the invention illustrating formation of an earthen vase, with the tool slightly withdrawn and carrying a removable core of earth.
Figure 5:
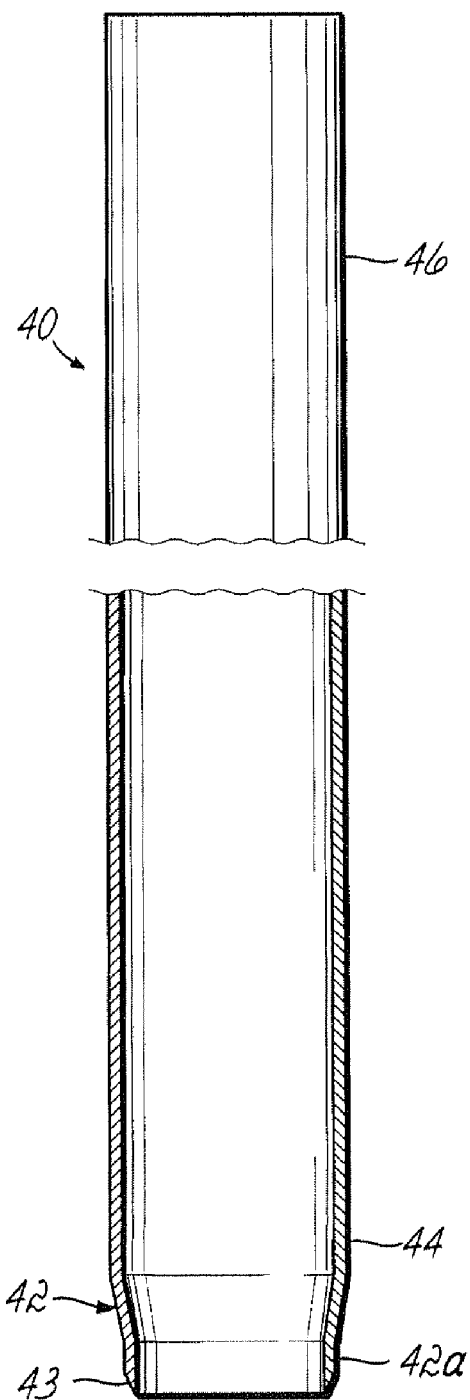
FIG. 5 is a cross-sectional view of the tool of FIGS. 2 and 4, illustrating elements of the tool.

With attention to FIG. 5, a vase-forming tool 40 is illustrated, FIG. 5 depicts features of the tool and FIG. 4, its use. In FIG. 5, the tool 40 has a forward cutting end or edge 43 with a tapering end portion 42 behind end 43. Tapering portion 42 extends between the forward end 44 of major tool portion 46 down to a finial cylindrical portion 42*a*, terminating in forward cutting edge 43. Preferably, the diameter of end portion 44 and major tool portion 46 is the same. Preferably, one tool 40 according to the invention has an outer major diameter of about 1⅛ inches, though member 44 tapered down at 42 at an outer diameter of about 1 inch between tool portion 44 and cutting end 43 at its narrowest forward cylindrical end 42*a*. Cylindrical end 42*a* extends axially for about ¼ to ½ inches or less, while taper 42 extends axially about ½ inch. Cylindrical end portion 42*a* may have a sharpened, annular, chisel-shaped forward cutting end 43 for cutting. Such other dimensions may be suitable.

An upper major end 46 of tool 40 (FIG. 4) is preferably of greater diameter than portions 42, 42*a*. Upper major end 46 is provided with a step 48 (not shown in FIG. 5) which may be formed with tool 40 by welding, bracketing or other expedient. Step 48 provides the means by which tool 40 can be thrust into the ground by foot pressure from an operator to create earthen vase 20 with a surgical incisiveness, leaving interior walls 24 relatively smooth, as opposed to granular, and porous for percolation of water therein to the surrounding earth 18.

The taper 42 and reduced diameter of end portion 42*a* facilitates tool insertion and withdrawal of core 50, which is removed and discarded, leaving a water percolating earthen vase 20. Since the cutting end or portion 42*a* is of lesser diameter than tool portions 46, 44, the cut core 50 residing in portion 44 is easily manually removed by an operator from tool 40 and discarded. The slight axial extension 42*a* of the tool end is sufficiently long to hold the core 50 by slight friction, which is easily overcome by finger pressure once the core 20 is formed and the tool is inverted so the captured core falls out and is thus ejected for disposal.

When the tool is inserted to form the vase, the outer surfaces of tool portions 44, then 46 (of greater outside diameter than forward cutting portions 42*a*, 43) tend to slightly compress or compact the earth as the tool 40 is pressed into the ground, leaving, upon tool withdrawal, an earthen vase 20 having a water percolating, more durable but smooth interior wall. Accordingly, the earth 18 at the vase wall is at least slightly more compacted than soil which surrounds the vase 20 just outside its smooth and slightly compacted wall. This is diagrammatically illustrated in the denser soil in the Figures at the vase walls.

While the tool shape and dimensions as shown are preferred, the noted taper 42 and the axial extensions of taper 42 and end 42*a* can be varied to produce various size vases up to a diameter of about three inches so long as the differences in diameter of respective portions 44 and 42*a* remain about ⅛ inch or so to facilitate core removal and to facilitate formation of the smooth vase walls.

In one method of use according to the invention, a water-percolating earthen vase 20 is formed such as by inserting a tool 40 into the ground, compacting the vase walls and then withdrawing the removed core. Water is poured into the earthen vase. Cut flowers are then placed, stem down, into the earthen vase 20, Thereafter, water may percolate from earthen vase 20 into surrounding earth 18, whether from original watering, sprinkling, rain, additional watering or other sources.

Such earthen vase 20 according to the invention comprises an earthen vase defined by a water porous, relatively smooth wall surface and contains stems of cut flowers, The vase can be placed near or immediately adjacent a monument, a marker in a cemetery or a garden. The water percolating earthen vase 20 does not contain deleterious standing water beyond the time it takes for water to naturally percolate through wall surface 24 into surrounding earth 18. Wall surface 24 is formed with a surgical incisiveness, slightly compacting the earth and smoothing the walls 24 while leaving them porous. Such formation tends to create an earthen vase 20 from which water still percolates naturally, but not at a faster rate which might result from a more granular wall. Accordingly, the flower stems 32 are adequately moisturized for longevity, but standing or stagnant water is eliminated.

Once the flowers 30 have outlived their usefulness, they are easily removed, but the earthen vase 20 remains and can be used indefinitely. Any collection of water by rain, sprinkling or the like is automatically depleted by percolation. The vase can be easily reformed with a tool 40 if necessary, should its walls deteriorate.

It will be appreciated that apart from the surrounding soil, the earthen vase 20 does not represent any tangible thing which can be stolen or vandalized. And mowing or other cemetery or garden maintenance can be performed without moving the vase.

Moreover, given the presence of surrounding grass or turf, the opening 22 of earthen vase 20 is unobtrusive and not readily seen, particular when there are no flowers therein.

Accordingly, the invention provides a water percolating earthen vase for cut flowers, which does not sustain standing or stagnant water, a method of use or tool and a method of forming.

These and other modification will be readily apparent to one of ordinary skill in the art without departing from the scope of the invention and applicant intends to be bound only by the claims appended hereto.

What is claimed is:

1. A tool for use in forming an earthen vase having smooth compacted walls, said tool comprising a tube having an axis;

said tube having a forward cylindrical section and a rearward cylindrical section, both developed about said axis;

said forward cylindrical section having a first outer diameter and said rearward cylindrical section having a second outer diameter larger than said first outer diameter;

said forward cylindrical section of said tube having a wall thickness defined by parallel outer and inner wall surfaces, both parallel to said axis;

said rearward cylindrical section of said tube having an inner diameter at least as great as the first outer diameter of the forward cylindrical section;

said tube having a tapering section tapering outwardly from a rearward end of said forward cylindrical section of parallel walls to a proximate end of said rearward cylindrical section;

said forward cylindrical section having an axial length shorter than an axial length of said rearward cylindrical section.

2. A tool as in claim 1 wherein said forward cylindrical section of said tube is integral with said rearward cylindrical section of said tube.

3. A tool as in claim 1 wherein said tube, behind said forward end, smoothes and compacts porous walls of said vase as said tube is manipulated with respect to earth defining said smooth porous walls.

4. A tool as in claim 1 wherein said tool in use is inserted into the earth forming an earthen vase therein having an upper section of a smooth compacted interior wall surface and a lower end portion of non-compacted interior wall surface that permits the drainage of pooled water by percolation before stagnation sets in and breeds mosquitoes.

5. A tool as in claim 4 wherein said tool in use is inserted into the earth forming an earthen vase therein having an upper section of a smooth compacted interior wall surface and a lower end portion of non-compacted interior wall surface that permits the drainage of pooled water by percolation before stagnation sets in and breeds mosquitoes; and wherein said lower end of said earthen vase has a depth corresponding to the axial length of said forward cylindrical section of said tube.

6. A tool as in claim 1 wherein said second diameter is greater than said first diameter by at least twice the wall thickness of said rearward cylindrical section.

7. A tool as in claim 6 wherein in use, said tool produces a slug of earth having a diameter less than that of said first outer diameter.

* * * * *